US010309206B2

(12) United States Patent
Delchambre et al.

(10) Patent No.: US 10,309,206 B2
(45) Date of Patent: Jun. 4, 2019

(54) WELL STIMULATION TOOL COMPRISING AN ARTICULATED LINK

(71) Applicant: ENE29 S.ÀR.L., Luxembourg (LU)

(72) Inventors: Michael Delchambre, Toulouse (FR); Laurent Feriol, Lauzerville (FR); Guillaume Onquiert, Cintegabelle (FR)

(73) Assignee: ENE29 S.ÀR.L., Luxembourg (LU)

( * ) Notice: Subject to any disclaimer, the term of this patent is extended or adjusted under 35 U.S.C. 154(b) by 20 days.

(21) Appl. No.: 15/546,376

(22) PCT Filed: Jan. 26, 2016

(86) PCT No.: PCT/EP2016/051564
§ 371 (c)(1),
(2) Date: Jul. 26, 2017

(87) PCT Pub. No.: WO2016/120267
PCT Pub. Date: Apr. 8, 2016

(65) Prior Publication Data
US 2017/0370198 A1   Dec. 28, 2017

(30) Foreign Application Priority Data

Jan. 27, 2015 (FR) ...................................... 15 50600

(51) Int. Cl.
| | |
|---|---|
| *E21B 28/00* | (2006.01) |
| *E21B 43/26* | (2006.01) |
| *E21B 36/04* | (2006.01) |
| *E21B 43/00* | (2006.01) |
| *E21B 43/24* | (2006.01) |
| *E21B 17/00* | (2006.01) |

(Continued)

(52) U.S. Cl.
CPC ............ *E21B 43/26* (2013.01); *E21B 17/003* (2013.01); *E21B 17/05* (2013.01); *E21B 28/00* (2013.01); *E21B 36/04* (2013.01); *E21B 43/003* (2013.01); *E21B 43/2401* (2013.01); *E21B 49/00* (2013.01); *G01V 1/157* (2013.01)

(58) Field of Classification Search
CPC ........ E21B 43/126; E21B 28/00; G01V 1/157
USPC ...................................................... 166/65.1
See application file for complete search history.

(56) References Cited

U.S. PATENT DOCUMENTS

| | | | |
|---|---|---|---|
| 4,345,650 A | 8/1982 | Wesley | |
| 4,479,680 A | 10/1984 | Wesley et al. | |

(Continued)

FOREIGN PATENT DOCUMENTS

WO    90/13830 A1    11/1990

*Primary Examiner* — Taras P Bemko
(74) *Attorney, Agent, or Firm* — Im IP Law; C. Andrew Im; Chai Im (57) ABSTRACT

An electrical tool for well stimulation includes a first electrode and a second electrode. The second electrode being at the level of a first segment and a second segment of the tool. A peripheral electrode insulated electrically from the first electrode. The first segment and the second segment are linked by an articulated link inside which is arranged a coaxial cable running from the first segment to the second segment. The coaxial cable includes an electrically conducting outer envelope insulated electrically from an electrically conducting central core. The tool includes a first electrical contact between the central core of the coaxial cable and the first electrode, and a second electrical contact between the outer envelope of the coaxial cable and the second electrode.

15 Claims, 4 Drawing Sheets

(51) Int. Cl.
   *E21B 17/05* (2006.01)
   *G01V 1/157* (2006.01)
   *E21B 49/00* (2006.01)

(56) References Cited

U.S. PATENT DOCUMENTS

| | | |
|---|---|---|
| 4,753,291 A | 6/1988 | Smith et al. |
| 4,997,044 A | 3/1991 | Stack |
| 2001/0011590 A1 | 8/2001 | Thomas et al. |
| 2012/0043075 A1* | 2/2012 | Abramova ............ E21B 43/003 166/249 |
| 2017/0002617 A1* | 1/2017 | Delchambre ........... E21B 28/00 |
| 2017/0002632 A1* | 1/2017 | Delchambre ........... E21B 28/00 |

* cited by examiner

WELL STIMULATION TOOL COMPRISING AN ARTICULATED LINK

RELATED APPLICATIONS

This application is a § 371 application from PCT/EP2016/051564 filed Jan. 26, 2016, which claims priority from French Patent Application No. 15 50600 filed Jan. 27, 2015, each of which is incorporated herein by reference in its entirety.

TECHNICAL FIELD

The present invention pertains to the field of well stimulation.

By "well stimulation" is meant the generating of a shock wave in a natural well or borehole. Well stimulation in particular enables an improved production from a well for extraction of underground resources (oil, natural gas, water, etc.), performing of a seismological study (for example, by making measurements with the aid of a sensor on the surface), accomplishing a fracturing of underground rock, etc.

BACKGROUND OF THE INVENTION

In the field of well stimulation it is known to use a tool of elongated shape, adapted to being inserted into a well.

Such a tool comprises a first electrode and a second electrode, electrically insulated from each other, extending substantially from one end to the other of said tool. Said first and second electrodes form a stimulation head in the area of one end of the tool. The stimulation head generally comprises a chamber designed to receive a fluid, into which said first and second electrodes emerge. Examples of the realization of such a tool are known:
- from U.S. Pat. No. 4,345,650, which describes a tool implemented to improve the production of a well for extraction of underground resources,
- from international patent application WO9013830, which describes a tool implemented to perform a seismological study,
- from U.S. Pat. No. 4,479,680, which describes a tool implemented to perform a fracturing of underground rock.

During stimulation operations, the tool is inserted into a well with the stimulation head toward the bottom, and it is lowered to the point where the stimulation needs to be performed. Once the stimulation point has been reached, pulses of high-intensity electric current (able to exceed several dozen kilo-amperes) are sent into the first electrode. A current arc is then formed in the chamber of the stimulation head between the first electrode and the second electrode (generally connected to the electrical ground). Said current arc enables the forming of a shock wave which will stimulate the well. For example, such a shock wave may enable an unclogging of the perforations of an extraction well.

In the fields of oil and gas, the boreholes are generally for the most part straight, such as vertical or horizontal, but they can also be nonstraight, for example, to get around an obstacle or reach a layer of hydrocarbon.

From patent application US 2001/011590 A1 there is known a stimulation tool to be inserted into a borehole, comprising several segments joined by articulated links enabling local bending of said stimulation tool. Thanks to these articulated links, such a stimulation tool can be inserted into a nonstraight borehole. However, owing to the high levels of voltage and current needed to generate a shock wave, there is a not insignificant risk of forming electric arcs inside the stimulation tool and/or in the area of the articulated link.

SUMMARY OF THE INVENTION

The purpose of the present invention is to remedy some or all of the limitations of the solutions of the prior art, especially those mentioned above, by proposing a solution which enables having a well stimulation tool adapted to being inserted into a nonstraight well while limiting the risks of formation of electric arcs inside the stimulation tool.

For this purpose, and according to a first aspect, the invention concerns an electric well stimulation tool, having a first electrode and a second electrode forming a stimulation head in the area of one end of the tool, said tool comprising at least a first segment and a second segment, said second electrode being in the area of the first segment and the second segment a peripheral electrode electrically insulated from said first electrode. The first segment and the second segment of the tool are joined by an articulated link inside which is disposed a coaxial cable extending from the first segment to the second segment, said coaxial cable comprising an electrically conductive outer envelope, electrically insulated from an electrically conductive central core. Moreover, the tool comprises:
- in the area of the first segment: means of electrical contact between the central core of the coaxial cable and the first electrode, and means of electrical contact between the outer envelope of said coaxial cable and the second electrode,
- in the area of the second segment: means of electrical contact between the central core of the coaxial cable and the first electrode, and means of electrical contact between the outer envelope of said coaxial cable and the second electrode.

Thus, the first electrode and the second electrode are arranged so that the first electrode corresponds to a central core of the tool, while the second electrode is arranged at the periphery of the tool and surrounds said first electrode. Such an arrangement makes it possible to maximize the distance between the first electrode and the second electrode (and thus the electrical insulating performance between them), so that the risks of formation of electric arcs inside the stimulation tool are reduced.

Moreover, the stimulation tool comprises an articulated link, inside which is disposed a coaxial cable which is connected to the first electrode and to the second electrode of the first segment and of the second segment. Because the coaxial cable is disposed inside the articulated link, no current circulates on the periphery of said articulated link. This is advantageous because if current were to circulate at the periphery of said articulated link, this might result in a seizing or even a welding of the latter. Furthermore, the arrangement of the central core and the outer envelope in the coaxial cable substantially reproduces the arrangement of the first electrode and the second electrode in the first segment and the second segment, and thus affords the same advantages in regard to high levels of voltage and current needed to generate the shock wave.

In particular embodiments, the well stimulation tool may furthermore comprise one or more of the following characteristics, taken in isolation or in any technically possible combinations.

In particular embodiments, the central core of the coaxial cable is separated from the outer envelope by a layer of electrically insulating material, said central core and said layer of electrically insulating material forming, in the area of the first segment and/or the second segment, portions of the coaxial cable not covered by the outer envelope.

Such arrangements make it possible to have means of electrical contact of the first electrode at a distance from the means of electrical contact of the second electrode, and thus reduce the risks of forming an electric arc between them.

Indeed, in the area of each of the segments, the electrical contact between the central core of the coaxial cable and the first electrode is realized in the area of a first contact zone, and the electrical contact between the outer envelope of the coaxial cable and the second electrode is realized in the area of a second contact zone. For example, the first contact zone is located in the area of the end of the portion not covered by the outer envelope, while the second contact zone is located necessarily in the area of said outer envelope. Consequently, by adjusting the length of said portion, one assures that the first contact zone and the second contact zone are at a distance from each other, preferably by at least 5 centimeters, or at least 10 centimeters, thereby reducing the risks of formation of an electric arc between the first contact zone and the second contact zone.

In particular embodiments, in the area of the first segment and/or the second segment, the electrical contact between the central core of the coaxial cable and the first electrode is realized in the area of one end of the coaxial cable electrically connected to the central core, and the electrical contact between the outer envelope of the coaxial cable and the second electrode is realized in the area of a peripheral surface of said outer envelope.

In particular embodiments, each peripheral surface of the outer envelope is disposed at a peripheral enlargement of said outer envelope.

In particular embodiments, in the area of the first segment and/or the second segment an electrically insulating material separating the first electrode from the second electrode covers at least partly each portion of the coaxial cable not covered by the outer envelope.

In particular embodiments, one end of the coaxial cable can move in translation inside the first segment, and is adapted to slide inside said first segment for a predefined length of travel.

Such arrangements make it possible to limit the risks that the coaxial cable will be damaged during bending of the articulated link. Furthermore, such arrangements also make it possible to absorb the changes in length of the coaxial cable in relation to that of the stimulation tool. In fact, such a stimulation tool during the stimulation operations is subjected to strong temperature variations which result in a dilatation/retraction of the coaxial cable and/or the stimulation tool.

In particular embodiments, in the area of the first segment the means of electrical contact of the central core comprise holding means adapted to hold the first electrode and the central core of the coaxial cable in contact for the entire travel length, and the means of electrical contact between the outer envelope and the second electrode are sliding means of contact in translation.

In particular embodiments, the end of the coaxial cable comprises means of abutment which cooperate with a wall of an internal cavity of the first segment so as to bound the travel of said end on the side with the articulated link.

In particular embodiments, the coaxial cable can move in rotation inside the first segment and the means of electrical contact in the area of said first segment are sliding means of contact in rotation.

Such arrangements make it possible to limit the risks that the coaxial cable will be damaged during the manipulating of the stimulation tool, by a rotation of the second segment relative to the first segment.

In particular embodiments, the means of electrical contact of the outer envelope of the coaxial cable in the area of the first segment comprise an annular part surrounding said outer envelope and rotationally fixed to said coaxial cable, said annular part being in sliding contact with the second electrode of the first segment.

In particular embodiments, the annular part comprises a plurality of contact fingers distributed about said annular part, said contact fingers bearing against an inner surface of the second electrode of the first segment.

In particular embodiments, the stimulation tool comprises clamping means adapted to hold the coaxial cable immobile in rotation and in translation inside the second segment.

In particular embodiments, the clamping means correspond to means of electrical contact between the outer envelope of the coaxial cable and the second electrode of the second segment.

In particular embodiments, the articulated link is a link of ball joint type.

In particular embodiments, the well stimulation tool is formed by a plurality of segments assembled end to end in reversible manner.

According to a second aspect, the present invention concerns a well stimulation device comprising a stimulation tool according to any one of the embodiments of the invention, and an electrical source connected to said stimulation tool.

BRIEF DESCRIPTION OF THE DRAWINGS

The invention will be better understood upon perusal of the following description, given as an example and in no way limiting, making reference to the Figures which show.

In these Figures, identical references from one Figure to another designate identical or analogous elements. For reasons of clarity, the elements shown are not true to scale, unless otherwise mentioned.

DETAILED DESCRIPTION OF EMBODIMENTS

Figure 1:
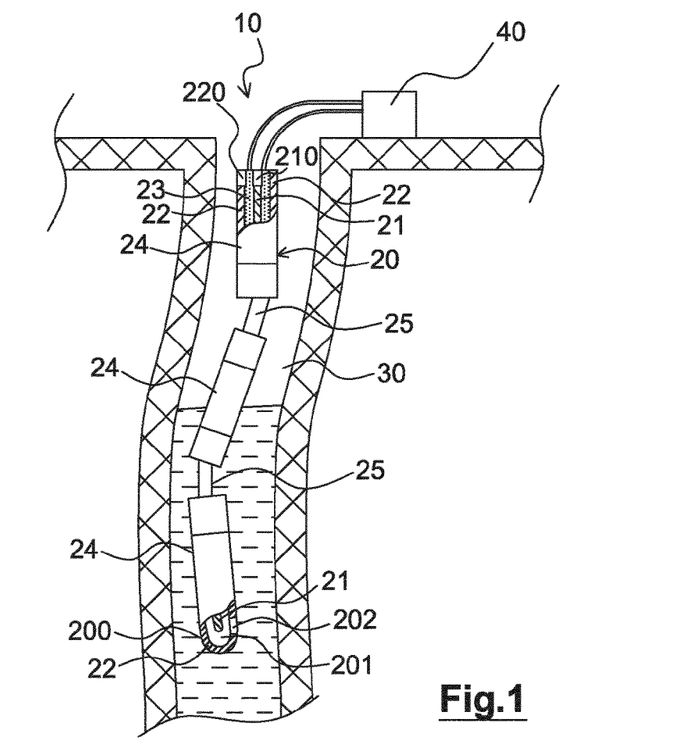
FIG. 1: a schematic half-section representation of a stimulation device in position in a well.

FIG. 1 shows schematically an exemplary embodiment of a well stimulation device 10 according to the invention.

In the rest of the description, we shall assume without being limited to this the case of a stimulation device 10 implemented to improve the production of a well for extraction of underground resources. However, and as previously stated, by "well stimulation" is understood in general the generating of an acoustic shock wave in a natural well or borehole. Such a well stimulation can be performed to improve the production of a well for extraction of underground resources, but also to perform a seismological study, to perform a fracturing of underground rock, etc.

As illustrated in FIG. 1, the stimulation device 10 comprises a tool 20 of elongated shape, adapted to be introduced into an extraction well 30 produced by drilling. The tool 20 can be formed, for example, by a plurality of segments assembled end to end in reversible manner.

More particularly, FIG. 1 represents a half-section view of the tool 20 in which the two ends of said tool 20 are represented in cross section. The tool 20 comprises in particular, in the area of a first end, a stimulation head 200 which is introduced toward the bottom in the extraction well 30 and a second end opposite said stimulation head 200.

The stimulation head 200 comprises, for example, a closed cavity 201 inside which emerge a first electrode 21 and a second electrode 22 of the tool 20. The first electrode 21 and the second electrode 22 are separated for example by a fluid confined inside the cavity 201. The cavity 201 is closed for example by a flexible wall 202 separating the fluid inside the cavity 201 and the underground resource at the bottom of the well. In other examples, nothing prevents from having a stimulation head 200 with an open cavity, in which case the fluid inside the cavity is the underground resource at the bottom of the well.

The first electrode 21 and the second electrode 22 extend as far as the second end of the tool 20, respectively up to a first terminal 210 and a second terminal 220 of said tool 20. The stimulation device 10 furthermore comprises an electrical source 40 connected to the first terminal 210 and to the second terminal 220 of the tool 20. In the nonlimiting example illustrated in FIG. 1, the electrical source 40 is outside the tool 20 and connected to the first terminal 210 and to the second terminal 220 by means of one or more electrical cables. According to other examples, nothing prevents from having an electrical source 40 integrated entirely or partly in the tool 20.

As illustrated by FIG. 1, the tool 20 likewise comprises several articulated links 25 joining different segments 24 of said tool 20. Thus, the tool 20 can be bent locally in the area of each articulated link 25, and it can be inserted into a borehole which is not straight.

Figure 2:
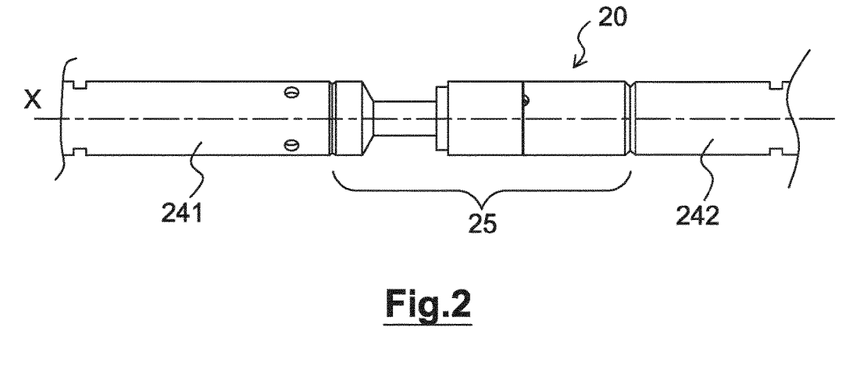
FIG. 2: a partial view of an exemplary embodiment of a stimulation tool in the area of an articulated link between a first segment and a second segment.

FIG. 2 shows schematically a partial view of an exemplary embodiment of a stimulation tool 20 comprising an articulated link 25 joining a first segment 241 and a second segment 242. As illustrated by FIG. 2, the tool 200 extends substantially along a longitudinal axis X, hereinafter designated as the "principal axis" of the tool 20.

In the tool 20, the first electrode 21 and the second electrode 22 are electrically insulated from each other by an electrically insulating material 23. Moreover, as previously stated, the second electrode 22 is preferably arranged at the periphery of the tool 20, while the first electrode 21 is preferably arranged at the center of the tool 20. In such a case, the first electrode 21 is for example a brass rod, forming a central core of the tool 20, while the second electrode 22 corresponds to the outer wall of the tool 20, and is a steel tube, for example. Thus, the second electrode 22 surrounds the electrically insulating material 23, which surrounds the first electrode 21.

As indicated above, such an arrangement of the first electrode 21 and the second electrode 22 in the tool 20 is desirable, particularly in the first segment 241 and in the second segment 242, in order to avoid the formation of electric arcs inside the tool 20, given the heavy current and voltage levels in question.

However, such an arrangement may not necessarily be preserved for the entire length of the tool 20. In particular, such an arrangement of the first electrode 21 and the second electrode 22 may not be preserved in the area of the articulated link 25, especially to avoid the risk of seizing or even welding of said articulated link 25 during the circulation of the current in the second electrode 22.

Figure 3:
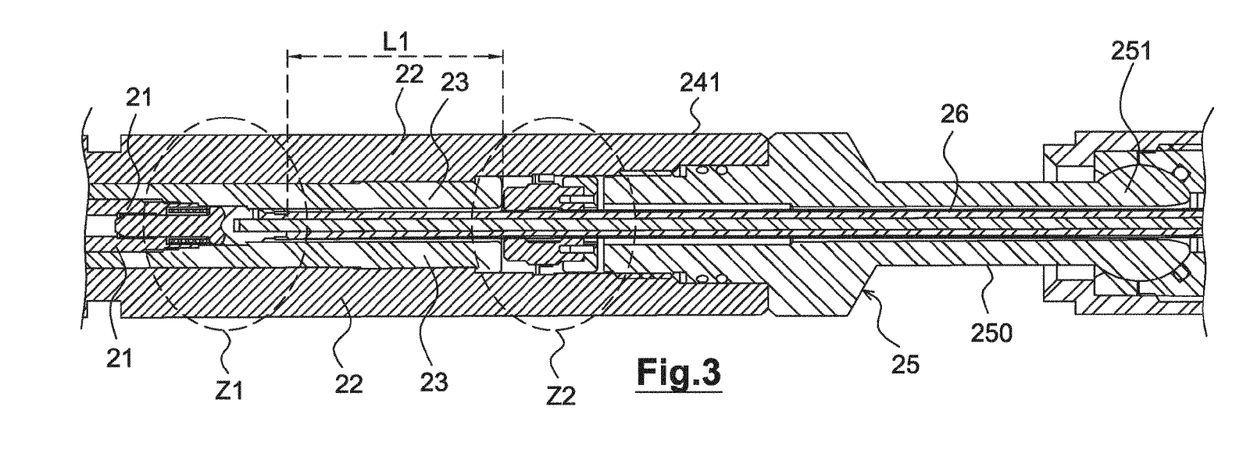
FIGS. 3 and 4: partial sectional views of the stimulation tool of FIG. 2, respectively on the side with the first segment and the side with the second segment.
Figure 4:
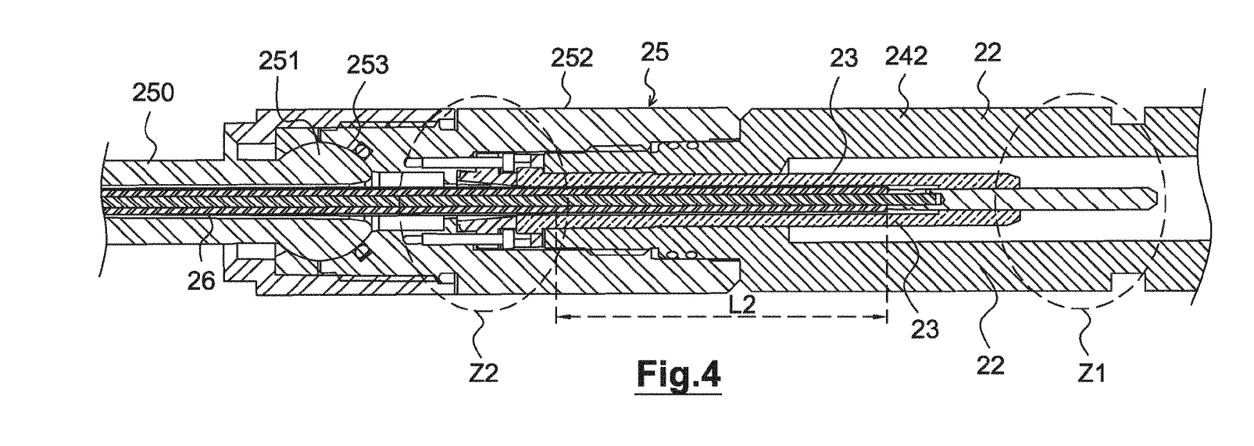

FIGS. 3 and 4 show partial sectional views of the tool 20 which is illustrated in FIG. 2. More particularly, FIG. 3 represents partially the first segment 241 and the articulated link 25, while FIG. 4 represents partially said articulated link 25 and the second segment 242. In the area of the first segment 241 and the second segment 242, the first electrode 21 is disposed substantially at the center of the tool 20, while the second electrode 22 is disposed at the periphery of the tool 20 and surrounds said first electrode 21.

In the nonlimiting example shown in FIGS. 3 and 4, the articulated link 25 is a link of ball joint type, that is, a link with three degrees of freedom in rotation and three degrees of linkage in translation (in other words, the articulated link 25 does not allow any movement in translation). However, the invention is applicable as long as the articulated link 25 has at least one degree of freedom in rotation enabling a bending of the tool 20.

The articulated link 25 comprises principally two elements:
  a first element 250 of overall elongated shape, broadened in the area of one end so as to form a ball joint 251,
  a second element 252 comprising a seat 253, whose shape is geometrically adapted to that of the ball joint 251, and in which said ball joint 251 can rotate.

In the nonlimiting example shown in FIGS. 3 and 4, the ball joint 251 may turn freely about the principal axis of the tool 20, whereby the first segment 241 and the second segment 242 rotate relative to each other while remaining aligned. The rotation of the ball joint 251 about the other axes, corresponding to bending axes of the articulated link 25, is on the other hand limited to predefined angle ranges, for example allowing a maximum bending of 10° of the first segment 241 relative to the second segment 242.

As illustrated by FIGS. 3 and 4, the first element 250 and the second element 252 comprise respective internal conduits which are substantially aligned and jointly form an internal conduit extending along the principal axis of the tool 20, from one end to the other of the articulated link 25.

The stimulation tool 20 furthermore comprises a flexible coaxial cable 26 disposed inside the internal conduit of the articulated link 25. Said coaxial cable 26 extends from the first segment 241 to the second segment 242 of the tool 20.

Figure 5:
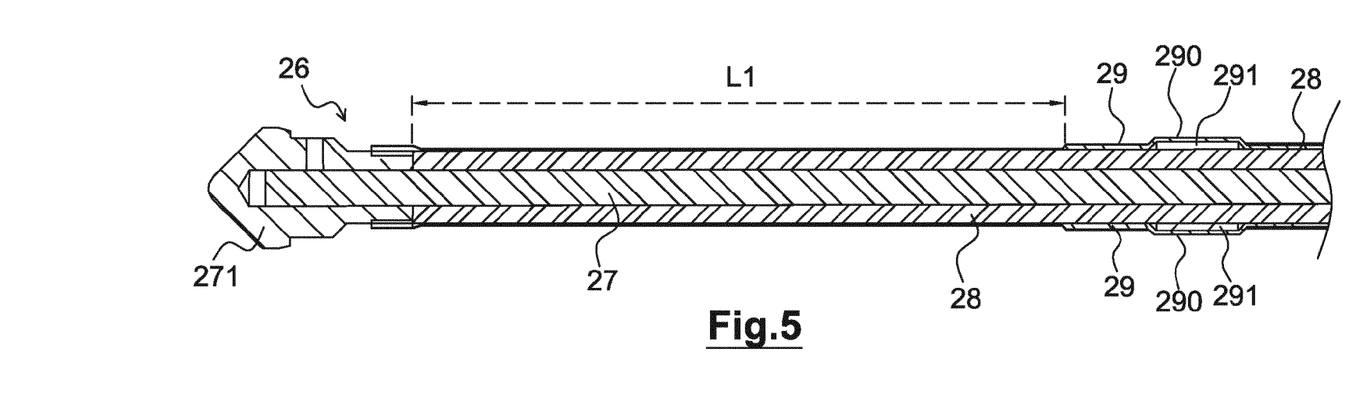
FIGS. 5 and 6: partial sectional views of an exemplary embodiment of a coaxial cable to be installed in the stimulation tool of FIG. 2, respectively on the side with the first segment and the side with the second segment.
Figure 6:
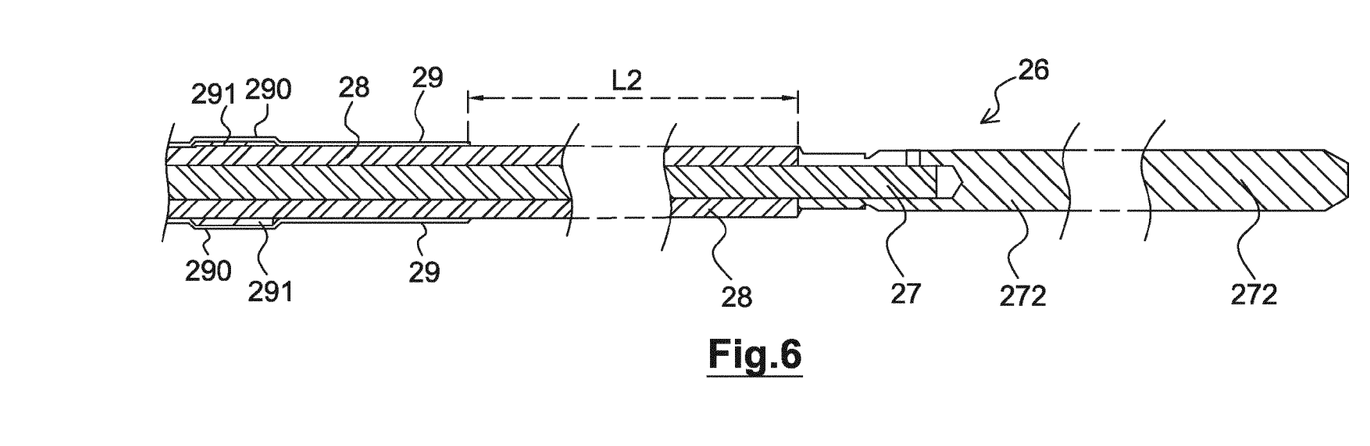

FIGS. 5 and 6 show schematically partial sectional views of an exemplary embodiment of a coaxial cable 26. More particularly, FIG. 5 shows one end of the coaxial cable 26 designed to be arranged on the side with the first segment 241, while FIG. 6 shows the other end of said coaxial cable, designed to be arranged on the side with the second segment 242.

As illustrated by FIGS. 5 and 6, the coaxial cable 26 of the tool 20 comprises an electrically conductive central core 27 (for example, a flexible copper conductor). The coaxial cable likewise comprises a layer 28 of electrically insulating material (such as silicone) surrounding the central core 27, and an electrically conductive outer envelope 29 (such as a flexible metal braiding) surrounding the layer 28 of electrically insulating material.

The central core 27 of the coaxial cable is designed to be electrically connected to the first electrode 21 of the tool 20, while the outer envelope 29 is designed to be electrically connected to the second electrode 22 of the tool 20. For this purpose, the tool 20 comprises:

- inside the first segment 241: means of electrical contact between the central core 27 of the coaxial cable 26 and the first electrode 21, and means of electrical contact between the outer envelope 29 of said coaxial cable 26 and the second electrode 22,
- inside the second segment 242: means of electrical contact between the central core 27 of the coaxial cable 26 and the first electrode 21, and means of electrical contact between the outer envelope 29 of said coaxial cable 26 and the second electrode 22.

In preferred embodiments, and as illustrated by FIGS. 3 to 6, the central core 27 and the layer 28 of electrically insulating material are of respective lengths, measured along the principal axis of the tool 20, greater than the length of the outer envelope 29. Furthermore, said central core 27 and said layer 28 of electrically insulating material are arranged so as to form, in the area of the first segment 241 and the second segment 242, portions of the coaxial cable 26 not covered by the outer envelope 29. Such an arrangement is optional, however, or may be realized only on a single side of the coaxial cable 26.

Such arrangements make it possible to ensure that a first contact zone Z1 between the central core 27 and the first electrode 21 of the first segment 241 (respectively, the second segment 242) and a second contact zone Z2 between the outer envelope 29 and the second electrode of the first segment 241 (respectively, the second segment 242) are at a distance from each other.

In fact, as illustrated by FIGS. 5 and 6, the central core 27 of the coaxial cable 26 is for example of length greater than that of the layer 28 of electrically insulating material and forms, in the area of the first segment 241 and the second segment 242, portions of the coaxial cable not covered by either said layer 28 of electrically insulating material or by the outer envelope 29. In the nonlimiting example illustrated by FIGS. 5 and 6, the coaxial cable 26 comprises electrically conductive parts 271, 272 secured to the central core 27 which form the ends of said coaxial cable by which the central core 27 is connected electrically to the first electrode 21 of the tool 20. On the side with the first segment 241 (respectively, the second segment 242), one finds that the minimum distance between the first contact zone Z1 and the second contact zone Z2 corresponds substantially to the length L1 (respectively, the length L2) along which the layer 28 of electrically insulating material is not covered by the outer envelope 29. The lengths L1 and L2 are preferably greater than 5 centimeters (cm), or greater than 10 cm, in order to limit the risks of formation of electric arcs between the first contact zone Z1 and the second contact zone Z2.

Preferably, and as illustrated by FIGS. 3 and 4, the electrically insulating material 23 of the tool 20 covers, in the area of the first segment 241 and the second segment 242, at least partly the portions of the coaxial cable 26 not covered by the outer envelope 29. Thus, the risks of formation of electric arcs are further reduced thanks to a reinforced electrical insulation between the first contact zones Z1 and the second contact zones Z2 (that is, between the electrical contact means of the central core 27 and those of the outer envelope 29).

In the nonlimiting examples illustrated by FIGS. 3 to 6, the second contact zones Z2 are formed by peripheral surfaces 290 of the outer envelope 29. However, in other examples, nothing prevents from considering second contact zones Z2 not extending for the entire periphery of the outer envelope 29, that is, not extending for the entire circumference of said outer envelope.

As illustrated by FIGS. 5 and 6, each peripheral surface 290 can be advantageously disposed at a peripheral broadening of the outer envelope 29, for example, one obtained by inserting a ferrule 291 between the layer 28 of electrically insulating material and said outer envelope 29. In such a case, the outer envelope 29 has an excess thickness which can facilitate the electrical contact between said outer envelope 29 and the second electrode 22.

In particular embodiments, the coaxial cable 26 is surrounded by a sheath of electrically insulating material. Such a sheath in particular enables an electrical insulation of the coaxial cable 26 from the articulated link 25, but also a protecting of the outer envelope 29. In such a case, the sheath is interrupted in the area of the peripheral surfaces 290 which are thus not covered.

In preferred embodiments, at least one end of the coaxial cable 26 is movable in translation and/or in rotation inside the first segment and/or the second segment 242. In fact, by allowing a certain mobility of at least one of the ends of the coaxial cable 26, the latter will be subjected to less force, especially when the articulated link 25 is bent, and/or in the event of dilatation/retraction of the coaxial cable 26 or the stimulation tool 20.

In the nonlimiting example illustrated by FIGS. 3 and 4, the coaxial cable 26 is translationally and rotationally fixed to the second segment 242, while said coaxial cable 26 is movable both in translation and in rotation with regard to the first segment 241.

Figure 7:
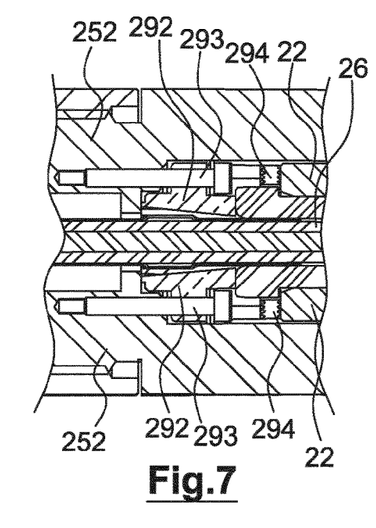
FIGS. 7 to 10: detail views of FIGS. 3 and 4, representing means of electrical contact between the coaxial cable of FIGS. 5 and 6 and the first and second segments of the stimulation tool.

In fact, as illustrated by FIG. 4, and in more detailed fashion by FIG. 7, the tool 20 comprises clamping means of the coaxial cable 26 which hold said coaxial cable immovable in rotation and in translation inside the second segment 242.

In the example illustrated by FIGS. 4 and 7, the clamping means comprise pliers 292 bearing against the peripheral surface 290 of the outer envelope 29 of the coaxial cable 26, and likewise helping establish an electrical contact between said outer envelope 29 and the second electrode 22 of the second segment 242. However, in other embodiments, nothing prevents from having clamping means of the coaxial cable not performing an electrical function within the tool 20. The pliers 292 are, for example, secured to the second element 252 of the articulated link 25, for example by means of screws 293 which likewise help clamp said pliers against the coaxial cable 26. The second element 252 is secured to the second segment 242 by any adapted means, for example, it is screwed onto it.

In the example illustrated by FIGS. 4 and 7, the means of electrical contact are supplemented by a conductive seal 294 (or a metallic spring or any other adapted means) arranged between the screws 293 and the second electrode 22 of the second segment 242.

The electrical contact between the central core 27 of the coaxial cable 26 and the first electrode 21 of the second segment 242 is realized for example by means of the part 272 secured to the end of said central core 27, and by a sleeve (not shown in the Figures) of said first electrode 21, inside which said part 272 engages. Preferably, the electrical contact between said part 272 and the inside of the sleeve is provided by shape-memory strips, a helical spring, or shims.

As previously indicated, in the nonlimiting example illustrated by FIGS. 3 and 4 the coaxial cable 26 is movable both in translation and in rotation with respect to the first segment 241. The end of the coaxial cable 26 is adapted to slide inside said first segment 241 for a predefined travel length Lc. The travel length Lc is chosen to allow the bending of the articulated link 25 in the desired angle ranges and, preferably taking into account possible dilatations/retractions of the tool 20 and/or of the coaxial cable 26 due to strong temperature variations.

Figure 8:
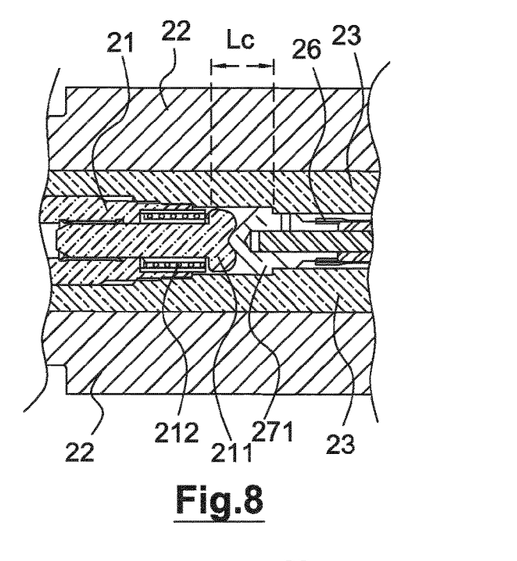

FIG. 8 shows schematically a detail view of an exemplary embodiment of the means of electrical contact between the central core 27 of the coaxial cable 26 and the first electrode 21 of the first segment 241.

In the nonlimiting example illustrated by FIG. 8, the first electrode 21 comprises a part 211 movable in translation along the principal axis of the tool 20 while abutting against the part 271 forming the end of the central core 27 on the side with the first segment 241. Said movable part 211 and said part 271 are in sliding rotational contact along the principal axis of the tool 20. Moreover, in this exemplary embodiment, the means of electrical contact likewise comprise holding means, such as a spring 212, adapted to hold the movable part 211 and the part 271 in contact for the entire travel length Lc of the end of the central core 27 inside the first segment 241. The spring 212 for example also ensures the electrical contact between the movable part 211 and the rest of the first electrode 21 of the first segment 241.

As illustrated by FIGS. 6 and 8, the part 271 forming the end of the central core 27 in the area of the first segment 241 is for example with maximum diameter greater than the diameter of the coaxial cable 26. Moreover, the first segment 241 comprises an internal cavity, for example one bounded in part by the electrically insulating material 23, inside which said part 271 slides. Said internal cavity comprises a wall against which said part 271 is stopped at the end of its travel on the side with the articulated link 25. It should be noted that this end stop function of the part 271 may alternatively be realized by other means, such as an enlargement of the layer 28 of electrically insulating material. On the other side the part 271 can slide as far as a maximum position corresponding to the position occupied, in the absence of bending of the articulated link 25, when the operating conditions are the most unfavorable in terms of dilatation/retraction of the tool 20 and the coaxial cable 26.

Figure 9:
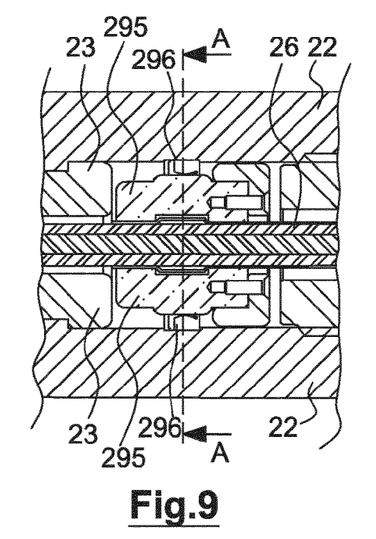
Figure 10:
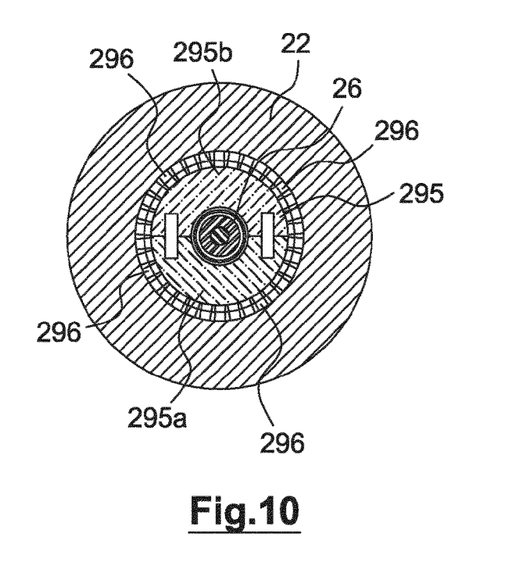

FIG. 9 shows schematically a detailed view of an exemplary embodiment of the means of electrical contact between the outer envelope 29 of the coaxial cable 26 and the second electrode 22 of the first segment 241. FIG. 10 shows a cross section view of said means of electrical contact in the sectioning plane A-A shown in FIG. 9.

As illustrated by FIGS. 9 and 10, the means of electrical contact of the outer envelope 29 of the coaxial cable 26 in the area of the first segment 241 comprise for example an annular part 295 surrounding said outer envelope in the area of the peripheral surface 290. The annular part 295 comprises, for example, two half-rings 295a, 295b secured to each other by screws and clamping the outer envelope 29 of the coaxial cable 26. The annular part 295 so assembled on the contour of the peripheral surface 290 is rotationally fixed to said coaxial cable 26. Furthermore, the annular part 295, made of electrically conductive material, is electrically connected to the outer envelope 29 of the coaxial cable 26.

In the nonlimiting example shown by FIGS. 9 and 10, the annular part 295 further comprises a plurality of contact fingers 296 distributed preferably in regular manner about the contour of said annular part 295. These contact fingers 296 bear against an internal surface of the second electrode 22 of the first segment 241 which, as illustrated in FIG. 10, surrounds said annular part 295. Said contact fingers 296 exert a radial force on the second electrode 22 which maintains the electrical contact between the annular part 295 and the second electrode 22 of the first segment 241. Thanks to the contact fingers 296, the annular part 295 is in sliding translatory and rotary contact with the second electrode 22 of the first segment 241. In other examples, however, nothing prevents from using other types of sliding contact between the annular part 295 and the second electrode 22.

As previously indicated, the means of sliding contact in translation allow a limiting of the risks of damaging the coaxial cable 26 during the bending of the articulated link 25, and also an absorbing of the changes in length of the coaxial cable 26 with respect to that of the stimulation tool 20.

The means of sliding contact in rotation also make it possible to limit the risks of damaging the coaxial cable 26 during the manipulating of the stimulation tool 20, especially when introducing it into the well 30. In fact, the second segment 242 may in certain cases rotate with respect to the first segment 241. In such a case, thanks to the sliding contact in rotation, no torsion will be applied to the coaxial cable 26.

More generally, it should be noted that the embodiments and methods of realization considered above have been described as nonlimiting examples, and other variants are consequently feasible.

In particular, the invention has been described by considering particular embodiments of the different means of electrical contact, whether sliding or otherwise. It will be understood that other exemplary embodiments are possible and that, more generally, any adapted means of electrical contact may be implemented to ensure the electrical continuity, through the coaxial cable 26, between the first electrode 21 and the second electrode 22 of the first segment 241 and the second segment 242.

The invention claimed is:

1. An electric well stimulation tool, comprising:
   a first electrode and a second electrode forming a stimulation head in a geometric space defined by one end of the electric well stimulation tool;
   at least a first segment and a second segment, the first segment and the second segment being joined by an articulated link, the second electrode in a geometric space defined by the first segment and the second segment is a peripheral electrode electrically insulated from the first electrode;
   a coaxial cable disposed inside the articulated link, the coaxial cable extending from the first segment to the second segment, the coaxial cable comprising an electrically conductive outer envelope, electrically insulated from an electrically conductive central core;
   in the geometric space defined by the first segment, an electrical contact between the central core of the coaxial cable and the first electrode and an electrical contact between the outer envelope of the coaxial cable and the second electrode; and
   in a geometric space defined by the second segment, an electrical contact between the central core of the coaxial cable and the first electrode and an electrical contact between the outer envelope of the coaxial cable and the second electrode.

2. The electric well stimulation tool as claimed in claim 1, wherein the central core of the coaxial cable is separated from the outer envelope by a layer of electrically insulating material, the central core and the layer of electrically insulating material forming, in the geometric space defined by at least one of the first segment and the second segment, portions of the coaxial cable not covered by the outer envelope.

3. The electric well stimulation tool as claimed in claim 2, wherein, in the geometric space defined by at least one of the first segment and the second segment, the electrical contact between the central core of the coaxial cable and the first electrode is realized in an area of one end of the coaxial cable electrically connected to the central core, and the electrical contact between the outer envelope of the coaxial cable and the second electrode is realized in a geometric space defined by a peripheral surface of the outer envelope.

4. The electric well stimulation tool as claimed in claim 3, wherein each peripheral surface of the outer envelope is disposed at a peripheral enlargement of the outer envelope.

5. The electric well stimulation tool as claimed in claim 2, wherein in the geometric space defined by at least one of the first segment and the second segment, an electrically insulating material separating the first electrode from the second electrode covers at least partly each portion of the coaxial cable not covered by the outer envelope.

6. The electric well simulation tool as claimed in claim 1, wherein one end of the coaxial cable is movable in translation inside the first segment and is configured to slide inside the first segment for a predetermined length of travel.

7. The electric well simulation tool as claimed in claim 6, wherein in the geometric space defined by the first segment, the electrical contact between the central core of the coaxial cable and the first electrode comprise a spring configured to hold the first electrode and the central core of the coaxial cable in contact for the entire predetermined length of travel, and the electrical contact between the outer envelope of the coaxial cable and the second electrode is a sliding translatory contact.

8. The electric well simulation tool as claimed in claim 6, wherein the one end of the coaxial cable comprises an abutment which cooperates with a wall of an internal cavity of the first segment so as to bound a travel of the one end of the coaxial cable on a side with the articulated link.

9. The electric well simulation tool as claimed in claim 6, wherein the electrical contact between the outer envelope of the coaxial cable and the second electrode in the geometric space defined by the first segment comprises an annular part surrounding the outer envelope and rotationally fixed to the coaxial cable, the annular part is in sliding contact with the second electrode in the geometric space defined by the first segment.

10. The electric well simulation tool as claimed in claim 9, wherein the annular part comprises a plurality of contact fingers distributed about the annular part, the plurality of contact fingers bearing against an inner surface of the second electrode in the geometric space defined by the first segment.

11. The electric well simulation tool as claimed in claim 1, wherein the coaxial cable is movable in rotation inside the first segment and the electrical contacts in the geometric space defined by the first segment are sliding rotational contacts.

12. The electric well simulation tool as claimed in claim 1, further comprising a damper configured to hold the coaxial cable immobile in rotation and in translation inside the second segment.

13. The electric well simulation tool as claimed in claim 1, wherein the articulated link is a link of ball joint type.

14. The electric well simulation tool as claimed in claim 1 is formed by a plurality of segments assembled end to end in a reversible manner.

15. A well stimulation device, comprising the electric well simulation tool as claimed in claim 1 and an electrical source connected to the electric well stimulation tool.

* * * * *